(12) United States Patent
Tago et al.

(10) Patent No.: US 9,662,543 B2
(45) Date of Patent: May 30, 2017

(54) GOLF BALL AND METHOD OF MANUFACTURE

(71) Applicant: Bridgestone Sports Co., Ltd., Tokyo (JP)

(72) Inventors: Takanori Tago, Chichibushi (JP); Atsushi Nanba, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 14/972,315

(22) Filed: Dec. 17, 2015

(65) Prior Publication Data

US 2016/0175663 A1   Jun. 23, 2016

(30) Foreign Application Priority Data

Dec. 18, 2014 (JP) .................. 2014-255854
Feb. 3, 2015 (JP) .................. 2015-019282

(51) Int. Cl.

| | |
|---|---|
| *A63B 37/02* | (2006.01) |
| *A63B 45/00* | (2006.01) |
| *A63B 37/00* | (2006.01) |
| *B05D 1/36* | (2006.01) |

(Continued)

(52) U.S. Cl.

CPC ............ *A63B 45/00* (2013.01); *A63B 37/005* (2013.01); *A63B 37/0033* (2013.01); *A63B 37/0039* (2013.01); *A63B 37/0045* (2013.01); *A63B 37/0059* (2013.01); *A63B 37/0074* (2013.01); *A63B 37/0075* (2013.01); *A63B 37/0076* (2013.01); *A63B 47/008* (2013.01); *B05D 1/18* (2013.01); *B05D 1/36* (2013.01)

(58) Field of Classification Search

CPC ............ A63B 37/0039; A63B 37/0075; A63B 37/005; A63B 37/0038; A63B 37/02; A63B 37/04; A63B 37/06; C09J 115/00; C09J 115/02; C09J 123/0876

See application file for complete search history.

(56) References Cited

U.S. PATENT DOCUMENTS

| | | | |
|---|---|---|---|
| 4,074,035 A | * | 2/1978 | Powers ..................... C08F 8/00 260/DIG. 31 |
| 6,106,415 A | | 8/2000 | Masutani et al. |

(Continued)

FOREIGN PATENT DOCUMENTS

| | | | |
|---|---|---|---|
| JP | 10-179795 A | | 7/1998 |
| JP | 11-137726 A | | 5/1999 |

(Continued)

*Primary Examiner* — John E Simms, Jr.
(74) *Attorney, Agent, or Firm* — Sughrue Mion, PLLC (57) ABSTRACT

In a golf ball having a core of at least one layer and a cover of at least one layer, at least one core or cover layer contains a butyl rubber ionomer. A method of manufacturing golf balls having a core of at least one layer and a cover of at least one layer includes the steps of preparing a treatment solution of butyl rubber ionomer dissolved in a solvent, applying the treatment solution to at least one layer of the golf ball, and covering the treated layer with, as an outer layer adjoining thereto, a rubber layer, a resin layer or a paint layer. With this golf ball and golf ball manufacturing method, adhesion between the layers can be improved, enabling the durability of the ball to cracking on impact to be increased.

18 Claims, 1 Drawing Sheet

(51) Int. Cl.
    *B05D 1/18*    (2006.01)
    *A63B 47/00*   (2006.01)

(56) References Cited

U.S. PATENT DOCUMENTS

| | | | |
|---|---|---|---|
| 6,124,389 A * | 9/2000 | Cavallaro | A63B 37/0003 473/373 |
| 6,334,819 B2 | 1/2002 | Ichikawa et al. | |
| 6,716,117 B2 | 4/2004 | Ichikawa et al. | |
| 7,867,419 B2 | 1/2011 | Ohira et al. | |
| 8,419,571 B2 | 4/2013 | Ohira et al. | |
| 2005/0250599 A1 * | 11/2005 | Watanabe | A63B 37/0003 473/371 |
| 2009/0169741 A1 * | 7/2009 | Hogge | A63B 37/005 427/241 |
| 2010/0234137 A1 * | 9/2010 | Higuchi | A63B 37/0003 473/373 |
| 2011/0009212 A1 * | 1/2011 | Goguen | A63B 37/005 473/372 |
| 2014/0194576 A1 * | 7/2014 | Jin | B60C 1/0016 525/210 |

FOREIGN PATENT DOCUMENTS

| | | |
|---|---|---|
| JP | 2003-339912 A | 12/2003 |
| JP | 2009-131631 A | 6/2009 |

* cited by examiner

GOLF BALL AND METHOD OF MANUFACTURE

CROSS-REFERENCE TO RELATED APPLICATION

This non-provisional application claims priority under 35 U.S.C. §119(a) on Patent Application Nos. 2014-255854 and 2015-019282 filed in Japan on Dec. 18, 2014 and Feb. 3, 2015, respectively, the entire contents of which are hereby incorporated by reference.

BACKGROUND OF THE INVENTION

Field of the Invention

The present invention relates to a golf ball having a core of at least one layer and a cover of at least one year. More particularly, the invention relates to a golf ball in which adhesion between the individual layers is improved, enabling the durability of the ball to cracking on impact to be increased, and to a method of manufacturing such a golf ball.

Prior Art

Solid golf balls with a multilayer construction of three or more pieces have come into frequent use in recent years, and even four-piece solid golf balls composed of a core encased by a cover of three or more layers, such as an envelope layer, an intermediate layer and an outermost layer, have made it onto the market. These multilayer golf balls are generally obtained by successively injection-molding synthetic resin cover materials around the core periphery so as to form a succession of individual layers over the core. However, when adhesion between the layers of the golf ball is poor, this may invite declines in various ball properties, such as the distance, spin rate on approach shots, feel and durability to cracking. Hence, there exists a desire to improve adhesion between the layers.

Art for improving adhesion between the layers of a golf ball includes that described in the following patent publications.

JP-A No. 10-179795 discloses art in which a layer of adhesive is formed on the intermediate layer. JP-A 11-137726 teaches art that blends an adhesive into a cover material composed primarily of a thermoplastic resin. JP-A 2003-339912 describes art wherein the surface of the inner layer in a cover having an inner layer and an outer layer is acid-washed, thereby improving adhesion between the inner layer which is made up of an ionomer resin and the outer layer which is made up of a non-ionomeric resin such as a polyurethane elastomer. Finally, JP-A 2009-131631 discloses a golf ball manufacturing method wherein, to improve adhesion between a rubber core and a urethane cover, the surface of the rubber core is treated with a solution containing a haloisocyanuric acid and/or a metal salt thereof, following which the treated core is encased with the cover material.

However, depending on the materials of which the individual layers are made, adhesion remains inadequate even in the foregoing prior art. Adhesion is particularly inadequate between a rubber core and an ionomer-based resin material, with decreases in such adhesion having an adverse influence on various properties of the golf ball.

It is therefore an object of this invention to provide a golf ball in which adhesion between the individual layers is improved, enabling various properties of the golf ball to be enhanced, particularly the durability to cracking on impact.

SUMMARY OF THE INVENTION

As a result of extensive investigations, we have discovered that, in a method of manufacturing multilayer golf balls having a core and a cover of one or more layer encasing the core, by treating the surface of the core with a butyl rubber ionomer-containing solution and then encasing the treated core with a cover material, adhesion between the core surface and the cover can be improved, enabling a high durability on impact to be obtained. In particular, when the core is abraded, minute irregularities typically form on the core surface. The butyl rubber ionomer-containing solution is able to fully make its way into the tiny irregularities on the abraded surface and improve adhesion with the envelope layer or intermediate layer covering the core surface. Also, there are cases in which it is conceivable that adhesion improves on account of interactions between rubber components of the butyl rubber ionomer and rubber components of the core layer and interactions between ionic components of the butyl rubber ionomer and ionic components of the ionomer-based resin material making up the envelope layer or intermediate layer. Such adhesion effects were found to be pronounced, particularly when water was added to the core formulation.

Accordingly, in a first aspect, the invention provides a golf ball that includes a core of at least one layer and a cover of at least one layer, wherein at least one layer from among the core and the cover of the ball contains a butyl rubber ionomer.

The golf ball preferably includes from 0.1 to 30 wt % of an inorganic filler.

The butyl rubber ionomer is typically prepared from a halogenated butyl rubber reacted with a nitrogen- or phosphorus-containing nucleophilic agent.

The butyl rubber ionomer preferably has an ionomer content of at least 0.1 mol %.

In the golf ball according to this aspect of the invention, it is preferable for the butyl rubber ionomer-containing layer to have a thickness of at least 1 μm and up to 100 μm.

In a preferred embodiment of the inventive golf ball, one layer adjoining the butyl rubber ionomer-containing layer is formed of a material molded under heat from a rubber composition containing: (I) a base rubber, (II) an organic peroxide, and (III) water and/or a metal monocarboxylate.

In another preferred embodiment of the inventive golf ball, one layer adjoining the butyl rubber ionomer-containing layer is formed primarily of a material obtained by blending as essential components:
100 parts by weight of a resin component composed of, in admixture, (A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random copolymer and/or a metal ion neutralization product of an olefin-unsaturated carboxylic acid-unsaturated carboxylic acid ester random copolymer in a weight ratio between 100:0 and 0:100, and (B) a non-ionomeric thermoplastic elastomer in a weight ratio between 100:0 and 50:50;

(C) from 5 to 120 parts by weight of a fatty acid and/or fatty acid derivative having a molecular weight of from 228 to 1,500; and (D) from 0.1 to 17 parts by weight of a basic inorganic metal compound capable of neutralizing un-neutralized acid groups in the base resin and component (C).

In the golf ball of the invention, the butyl rubber ionomer-containing layer preferably has a bond strength with a layer adjoining thereto of at least 1.18 N/4 mm.

In a second aspect, the invention provides a method of manufacturing a golf ball having a core of at least one layer and a cover of at least one layer, which method includes the steps of, in order: preparing a treatment solution of butyl rubber ionomer dissolved in a solvent; applying the treatment solution to at least one layer from among the core and the cover of the ball; and covering the treated layer with, as an outer layer adjoining thereto, a rubber layer, a resin layer or a paint layer.

In the golf ball manufacturing method according to this aspect of the invention, the butyl rubber ionomer is typically prepared from a halogenated butyl rubber reacted with a nitrogen- or phosphorus-containing nucleophilic agent.

In the golf ball manufacturing method of the invention, the butyl rubber ionomer treatment solution is preferably applied to at least one layer from among the core and the cover of the ball by a dipping method, which dipping method may be carried out at room temperature.

In the manufacturing method of the invention, the solvent used to prepare the butyl rubber ionomer treatment solution preferably includes isooctane, benzene, toluene or chloroform.

With the golf ball and golf ball manufacturing method of the invention, adhesion between the layers can be improved, enabling the durability of the ball to cracking on impact to be increased.

DESCRIPTION OF THE DIAGRAM

DETAILED DESCRIPTION OF THE INVENTION

The objects, features and advantages of the invention will become more apparent from the following detailed description, taken in conjunction with the foregoing diagrams.

The golf ball of the invention includes a core of at least one layer and a cover of at least one layer.

The core may be formed using a known rubber composition. Although not particularly limited, preferred examples include rubber compositions formulated as described below.

The material forming the core may be composed primarily of a rubber material. For example, the core may be formed using a rubber composition which includes, together with a base rubber, such ingredients as a co-crosslinking agent, an organic peroxide, an inert filler, sulfur, an antioxidant and an organosulfur compound.

The use of polybutadiene as the base rubber of the rubber composition is preferred. The polybutadiene is preferably one having a cis-1,4 bond content on the polymer chain of at least 80 wt %, more preferably at least 90 wt %, and even more preferably at least 95 wt %. At a content of cis-1,4 bonds among the bonds on the polybutadiene molecule which is too low, the resilience may decrease. The polybutadiene has a content of 1,2-vinyl bonds on the polymer chain of preferably not more than 2%, more preferably not more than 1.7%, and even more preferably not more than 1.5%. At a 1,2-vinyl bond content that is too high, the resilience may decrease.

To obtain a molded and vulcanized rubber composition having a good resilience, the polybutadiene included is preferably one synthesized with a rare-earth catalyst or a group VIII metal compound catalyst. Polybutadiene synthesized with a rare-earth catalyst is especially preferred.

Rubber components other than the above polybutadiene may be included in the rubber composition, insofar as the objects of the invention are attainable. Illustrative examples of rubber components other than the above polybutadiene include other polybutadienes and also other diene rubbers, such as styrene-butadiene rubber, natural rubbers, isoprene rubbers and ethylene-propylene-diene rubber.

Examples of co-crosslinking agents include unsaturated carboxylic acids and the metal salts of unsaturated carboxylic acids. Specific examples of unsaturated carboxylic acids include acrylic acid, methacrylic acid, maleic acid and fumaric acid. The use of acrylic acid or methacrylic acid is especially preferred. Metal salts of unsaturated carboxylic acids include, without particular limitation, the above unsaturated carboxylic acids that have been neutralized with desired metal ions. Specific examples include the zinc salts and magnesium salts of methacrylic acid and acrylic acid. The use of zinc acrylate is especially preferred.

The unsaturated carboxylic acid and/or metal salt thereof is included in an amount, per 100 parts by weight of the base rubber, which is preferably at least 5 parts by weight, more preferably at least 10 parts by weight, and even more preferably at least 15 parts by weight. The amount included is preferably not more than 60 parts by weight, more preferably not more than 50 parts by weight, even more preferably not more than 40 parts by weight, and most preferably not more than 30 parts by weight. Too much may make the core too hard, giving the ball an unpleasant feel at impact, whereas too little may lower the rebound.

The organic peroxide may be a commercially available product, specific examples of which include those available under the trade names Percumyl D, Perhexa 3M, Perhexa C-40, Niper BW and Peroyl L (all from NOF Corporation), and Luperco 231XL (from Atochem Co.). The use of one of these alone is preferred.

The amount of organic peroxide included per 100 parts by weight of the base rubber is preferably at least 0.1 part by weight, more preferably at least 0.3 part by weight, even more preferably at least 0.5 part by weight, and most preferably at least 0.7 part by weight. The upper limit is preferably not more than 5 parts by weight, more preferably not more than 4 parts by weight, even more preferably not more than 3 parts by weight, and most preferably not more than 2 parts by weight. When too much or too little is included, it may not be possible to obtain a ball having a good feel, durability and rebound.

Examples of preferred inert fillers include zinc oxide, barium sulfate and calcium carbonate. These may be used singly or as a combination of two or more thereof.

The amount of inert filler included per 100 parts by weight of the base rubber is preferably at least 1 part by weight, and more preferably at least 5 parts by weight. The upper limit in the amount included is preferably not more than 100 parts by weight, more preferably not more than 80 parts by weight, and even more preferably not more than 60 parts by weight. Too much or too little inert filler may make it impossible to obtain a proper weight and a good rebound.

In addition, an antioxidant may be optionally included. Illustrative examples of suitable commercial antioxidants include Nocrac NS-6, Nocrac NS-30 and Nocrac 200 (all available from Ouchi Shinko Chemical Industry Co., Ltd.), and Yoshinox 425 (available from Yoshitomi Pharmaceutical Industries, Ltd.). These may be used singly or as a combination of two or more thereof.

The amount of antioxidant included can be set to more than 0, and may be set to an amount per 100 parts by weight of the base rubber which is preferably at least 0.05 part by weight, and more preferably at least 0.1 part by weight. The maximum amount included, although not subject to any particular limitation, may be set to an amount per 100 parts by weight of the base rubber which is preferably not more than 3 parts by weight, more preferably not more than 2 parts by weight, even more preferably not more than 1 part by weight, and most preferably not more than 0.5 part by weight. Too much or too little antioxidant may make it impossible to achieve a suitable core hardness gradient, a good rebound and durability, and a good spin rate-lowering effect on full shots.

An organosulfur compound may be optionally included in the rubber composition in order to enhance the core resilience. In cases where an organosulfur compound is included, the content thereof per 100 parts by weight of the base rubber may be set to preferably at least 0.05 part by weight, and more preferably at least 0.1 part by weight. The upper limit in the organosulfur compound content may be set to preferably not more than 5 parts by weight, more preferably not more than 4 parts by weight, and even more preferably not more than 2 parts by weight. Including too little organosulfur compound may make it impossible to obtain a sufficient core rebound-increasing effect. On the other hand, when too much is included, the core hardness may become too low, worsening the feel of the ball at impact, and the durability of the ball to cracking on repeated impact may worsen.

Moreover, the core may be formed of a material molded under heat from a rubber composition which includes as the essential ingredients: (I) a base rubber, (II) an organic peroxide, and (III) water and/or a metal monocarboxylate.

The golf ball of this invention, as will be subsequently described, has a butyl rubber ionomer-containing layer. In the inventive ball, it is preferable for one layer adjoining this butyl rubber ionomer-containing layer to be formed of a material molded under heat from a rubber composition which includes the foregoing components I to III.

That is, by forming the core of a material molded under heat from a rubber composition which includes (I) a base rubber, (II) an organic peroxide, and (III) water and/or a metal monocarboxylate, the difference in crosslink density between the center and surface of the core and the dynamic viscoelastic properties in the center portion of the core can be suitably controlled, making it possible to provide a golf ball which achieves a lower spin rate, is endowed with a good durability, and moreover undergoes little change in rebound even with long-term use.

Also, decomposition of the organic peroxide within the core formulation can be promoted by the direct addition of water (or a water-containing material) to the core material. Moreover, it is known that the decomposition efficiency of the organic peroxide within the core-forming rubber composition changes with temperature and that, starting at a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to build-up of the heat of decomposition by the organic peroxide which has decomposed from the outside, becomes considerably higher than the mold temperature. In cases where water (or a water-containing material) is added directly to the core, because the water acts to promote decomposition of the organic peroxide, radical reactions like those described above can be made to differ in the core center and at the core surface. That is, decomposition of the organic peroxide is further promoted near the center of the core, bringing about greater radical deactivation, which leads to a further decrease in the amount of active radicals. As a result, it is possible to obtain a core in which the crosslink densities at the core center and the core surface differ markedly. It is also possible to obtain a core having different dynamic viscoelastic properties at the core center.

When zinc monoacrylate is used instead of the above water, water is generated from the zinc monoacrylate by heat during mixing of the compounding materials. An effect similar to that obtained by the addition of water can thereby be obtained.

Base rubbers and organic peroxides of the same types as those mentioned earlier may be advantageously used as the base rubber and the organic peroxide serving as components I and II.

The water serving as component III is not particularly limited, and may be distilled water or tap water. The use of distilled water which is free of impurities is especially preferred. The amount of water included per 100 parts by weight of the base rubber is preferably at least 0.1 part by weight, and more preferably at least 0.3 part by weight. The upper limit is preferably not more than 5 parts by weight, and more preferably not more than 4 parts by weight.

By including a suitable amount of such water, the moisture content in the rubber composition prior to vulcanization becomes preferably at least 1,000 ppm, and more preferably at least 1,500 ppm. The upper limit is preferably not more than 8,500 ppm, and more preferably not more than 8,000 ppm. When the moisture content of the rubber composition is too low, it may be difficult to obtain a suitable crosslink density and tan $\delta$, which may make it difficult to mold a golf ball having little energy loss and a reduced spin rate. On the other hand, when the moisture content of the rubber composition is too high, the core may be too soft, which may make it difficult to obtain a suitable core initial velocity.

It is also possible to add water directly to the rubber composition. The following methods (i) to (iii) may be employed to include water:
(i) applying steam or ultrasonically applying water in the form of a mist to some or all of the rubber composition (compounded material);
(ii) immersing some or all of the rubber composition in water;
(iii) letting some or all of the rubber composition stand for a given period of time in a high-humidity environment in a place where the humidity can be controlled, such as a constant humidity chamber.

As used herein, "high-humidity environment" is not particularly limited, so long as it is an environment capable of moistening the rubber composition, although a humidity of from 40 to 100% is preferred.

Alternatively, the water may be worked into a jelly state and added to the above rubber composition. Or a material obtained by first supporting water on a filler, unvulcanized rubber, rubber powder or the like may be added to the rubber composition. In such a form, the workability is better than when water is directly added to the composition, enabling the golf ball production efficiency to be enhanced. The type of material in which a given amount of water has been included, although not particularly limited, is exemplified by fillers, unvulcanized rubbers and rubber powders in which sufficient water has been included. The use of a material which causes no loss of durability or resilience is especially preferred. The moisture content of the above material is preferably at least 3 wt %, more preferably at least 5 wt %, and even more preferably at least 10 wt %. The upper limit is preferably not more than 99 wt %, and even more preferably not more than 95 wt %.

In this invention, a metal monocarboxylate may be used instead of the above-described water. Metal monocarboxylates, in which the carboxylic acid is presumably coordination-bonded to the metal, are distinct from metal dicarboxylates such as zinc diacrylate of the formula $(CH_2=CHCOO)_2Zn$, in which two carboxylic acid molecules are bonded to a single metal atom. A metal monocarboxylate introduces water into the rubber composition by way of a dehydration/condensation reaction, and thus provides an effect similar to that of water. Moreover, because a metal monocarboxylate can be added to the rubber composition as a powder, the operations can be simplified and uniform dispersion within the rubber composition is easy. In order to carry out the above reaction effectively, a monosalt is required. The amount of metal monocarboxylate included per 100 parts by weight of the base rubber is preferably at least 1 part by weight, and more preferably at least 3 parts by weight. The upper limit in the amount of metal monocarboxylate included is preferably not more than 60 parts by weight, and more preferably not more than 50 parts by weight. When the amount of metal monocarboxylate included is too small, it may be difficult to obtain a suitable crosslink density and tan δ, as a result of which a sufficient golf ball spin rate-lowering effect may not be achievable. On the other hand, when too much is included, the core may become too hard, as a result of which it may be difficult for the ball to maintain a suitable feel at impact.

The carboxylic acid used may be, for example, acrylic acid, methacrylic acid, maleic acid, fumaric acid or stearic acid. Examples of the substituting metal include sodium, potassium, lithium, zinc, copper, magnesium, calcium, cobalt, nickel and lead, although the use of zinc is preferred. Illustrative examples of the metal monocarboxylate include zinc monoacrylate and zinc monomethacrylate, with the use of zinc monoacrylate being especially preferred.

The rubber composition containing the various above ingredients is prepared by mixture using a typical mixing apparatus, such as a Banbury mixer or a roll mill. When this rubber composition is used to mold the core, molding may be carried out by compression molding or injection molding using a specific mold for molding cores. The resulting molded body is then heated and cured under temperature conditions sufficient for the organic peroxide and co-crosslinking agent included in the rubber composition to act, thereby giving a core having a specific hardness profile. The vulcanization conditions in this case, while not subject to any particular limitation, are generally set to a temperature of from about 130 to about 170° C., and especially 150 to 160° C., and a time of from 10 to 40 minutes, and especially 12 to 20 minutes.

Next, the cover used in the inventive golf ball is described. The cover is a member that encases the core and is composed of at least one layer. Exemplary covers include two-layer covers and three-layer covers. In the case of a two-layer cover, the inner layer is referred to as the intermediate layer and the outer layer is referred to as the outermost layer. In the case of a three-layer cover, the respective layers are referred to, in order from the inside: the envelope layer, the intermediate layer and the outermost layer.

Known resins may be used without particular limitation as the resin materials which form the cover. Use can be made of one, two or more resins selected from the group consisting of ionomer resins, and urethane-, amide-, ester-, olefin- and styrene-based thermoplastic elastomers.

The ionomer resin is not subject to any particular limitation, and may be a known product. Commercial products that may be used as the ionomer resin include, for example, H1706, H1605, H1557, H1601, AM7329, AM7317 and AM7318, all of which are available from DuPont-Mitsui Polychemicals Co.

Thermoplastic elastomers are exemplified by polyester elastomers, polyamide elastomers and polyurethane elastomers. The use of a polyurethane elastomer is especially preferred.

The polyurethane elastomer is not particularly limited, provided it is an elastomer composed primarily of polyurethane. A morphology that includes soft segments composed of a high-molecular-weight polyol compound and hard segments composed of a diisocyanate and a monomolecular chain extender is preferred.

Exemplary polymeric polyol compounds include, but are not particularly limited to, polyester polyols and polyether polyols. From the standpoint of rebound resilience or low-temperature properties, the use of a polyether polyol is preferred. Examples of polyether polyols include polytetramethylene glycol and polypropylene glycol, with the use of polytetramethylene glycol being especially preferred. These polyether polyols have a number-average molecular weight of preferably from 1,000 to 5,000, and more preferably from 1,500 to 3,000.

Exemplary diisocyanates include, but are not particularly limited to, aromatic diisocyanates such as 4,4'-diphenylmethane diisocyanate, 2,4-toluene diisocyanate and 2,6-toluene diisocyanate; and aliphatic diisocyanates such as hexamethylene diisocyanate. In the practice of this invention, from the standpoint of reaction stability with the subsequently described isocyanate mixture when blended therewith, the use of 4,4'-diphenylmethane diisocyanate is preferred.

The monomolecular chain extender is not particularly limited, although use can be made of an ordinary polyol or polyamine. Specific examples include 1,4-butylene glycol, 1,2-ethylene glycol, 1,3-propylene glycol, 1,3-butanediol, 1,6-hexylene glycol, 2,2-dimethyl-1,3-propanediol, 1,3-butylene glycol, dicyclohexylmethylmethanediamine (hydrogenated MDA) and isophoronediamine (IPDA). These chain extenders have average molecular weights of preferably from 20 to 15,000.

A commercial product may be used as the polyurethane elastomer. Illustrative examples include Pandex T7298, TR3080, T8230, T8290, T8295 and T8260 (all available from DIC Bayer Polymer, Ltd.), and Resamine 2593 and 2597 (available from Dainichiseika Color & Chemicals Mfg. Co., Ltd.). These may be used singly, or two or more may be used in combination.

The material which forms the cover is exemplified by a resin composition containing the following components A to D as the essential components:

100 parts by weight of a resin component composed of, in admixture, (A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random copolymer and/or a metal ion neutralization product of an olefin-unsaturated carboxylic acid-unsaturated carboxylic acid ester random copolymer in a weight ratio between 100:0 and 0:100, and (B) a non-ionomeric thermoplastic elastomer in a weight ratio between 100:0 and 50:50;

(C) from 5 to 120 parts by weight of a fatty acid and/or fatty acid derivative having a molecular weight of from 228 to 1,500; and (D) from 0.1 to 17 parts by weight of a basic inorganic metal compound capable of neutralizing un-neutralized acid groups in components A and C.

The golf ball of this invention, as subsequently described, is characterized by having a butyl rubber ionomer-containing layer. To more fully exhibit the desired effects of the invention, it is preferable to use a resin material containing above components A and B in one layer adjoining the butyl rubber ionomer-containing layer. The use of a resin material containing all of the above ingredients A, B, C and D is more preferred.

Components A to D in the resin material described in, for example, JP-A 2011-120898 may be advantageously used as above components A to D.

Various additives may be optionally included in the cover-forming material. For example, pigments, dispersants, antioxidants, light stabilizers, ultraviolet absorbers and internal mold lubricants may be suitably included.

A known method may be used without particular limitation as the method of forming the layers of the cover. For example, use may be made of a method in which a prefabricated core or a sphere encased by any of the various layers is placed in a mold, and the resin material prepared as described above is injection-molded over the core or layer-encased sphere. Also, a layer of paint may be provided on the surface of the outermost layer of this cover.

In this invention, butyl rubber ionomer is included in at least one layer of the golf ball. The butyl rubber ionomer used for this purpose may be the butyl rubber ionomer described below and mentioned in, for example, JP-A 2008-156606.

The content of butyl rubber ionomer included in at least one core or cover layer of the golf ball is not particularly limited, and is typically from 1 to 100 wt %, preferably at least 5 wt %, more preferably at least 20 wt %, and even more preferably at least 80 wt %, of the total weight of the layer. When this content is too low, adhesion with the layer that bonds thereto may decrease.

The butyl rubber ionomer is prepared from a halogenated butyl rubber polymer. The butyl rubber polymer is generally derived from at least one isoolefin monomer, at least one polyolefin monomer, and an additional copolymerizable monomer.

The butyl rubber polymer is not limited to a specific isoolefin. However, isoolefins having from 4 to 16 carbon atoms, and preferably from 4 to 7 carbon atoms, such as isobutene, 2-methyl-1-butene, 3-methyl-1-butene, 2-methyl-2-butene, and mixtures thereof, are desirable.

The butyl rubber polymer is not limited to specific polyolefins. Use can be made of a polyolefin that is copolymerizable with the isoolefin. However, the use of a polyolefin having from 4 to 14 carbon atoms, such as isoprene, butadiene, 2-methylbutadiene, 2,4-dimethylbutadiene, 3-methyl-1,3-pentadiene, 2,4-hexadiene, 2-methyl-1,5-hexadiene, 2,5-dimethyl-2,4-hexadiene, 2-methyl-1,4-pentadiene, 2-methyl-1,6-heptadiene, cyclopentadiene, cyclohexadiene and mixtures thereof, and especially a conjugated diene, is preferred. The use of isoprene is more preferred.

As an optional monomer, use can be made of a monomer that is copolymerizable with an isoolefin and/or a diene. Preferred use can be made of α-methylstyrene, p-methylstyrene, chlorostyrene, and other styrene derivatives.

In one embodiment, the butyl rubber ionomer is prepared from a butyl rubber polymer containing from 1.5 to 2.2 mol % of a polyolefin monomer. In another embodiment, the butyl rubber ionomer is prepared from a butyl rubber polymer having a higher polyolefin content (e.g., greater than 2.5 mol %).

The butyl rubber polymer can then be furnished to a halogenating step so as to generate a halobutyl polymer. Bromination or chlorination may be carried out in accordance with, for example, the procedure described in the third edition of *Rubber Technology* edited by Maurice Morton (Kluwer Academic Publishers), pp. 297-300, and in additional literature cited therein.

At the time of halogenation, some or all of the polyolefin included in the butyl polymer converts to an allyl halide. Therefore, the allyl halide within the halobutyl polymer is a repeating unit derived from the polyolefin monomer originally present in the butyl polymer. The total amount of allyl halide included in the halobutyl polymer cannot exceed the initial content of polyolefin in the butyl polymer from which the halobutyl polymer is prepared.

The allyl halide sites on the halobutyl polymer can be subsequently reacted with at least one type of nitrogen- or phosphorus-containing nucleating agent of the following formula.

In the formula, A is nitrogen or phosphorus; and $R_1$, $R_2$ and $R_3$ are linear or branched $C_{1-18}$ alkyl substituents, aryl substituents which are monocyclic or composed of a $C_{4-8}$ fused ring, and/or heteroatoms (such as atoms selected from among boron, nitrogen, oxygen, silicon, phosphorus and sulfur).

A suitable nucleating agent will generally include at least one nitrogen or phosphorus center having a lone electron pair which is both electronically and sterically available to take part in a nucleophilic displacement reaction. Examples of preferred nucleating agents include trimethylamine, triethylamine, trimethylphosphine and triethylphosphine.

The amount of nucleating agent furnished to the reaction with butyl rubber may be set within the range of preferably 0.1 to 5 mole equivalents, more preferably 0.2 to 4 mole equivalents, and even more preferably 0.3 to 3 mole equivalents, based on the total molar quantity of allyl halide present in the halobutyl polymer.

Because the nucleating agent reacts with allyl halide groups on the halobutyl polymer, the ionomeric moieties obtained from the reaction are repeating units derived from allyl halide. Therefore, the total content of ionomeric moieties in the butyl ionomer cannot exceed the initial amount of allyl halide within the halobutyl polymer. On the other hand, residual allyl halide and/or residual polyolefin may be present. The halobutyl ionomer obtained from the reaction has an ionomeric moiety content of preferably at least 0.1 mol %, more preferably at least 0.2 mol %, and even more preferably at least 0.3 mol %. The residual allyl halide may be present in an amount of from 0.1 mol % and up to an amount not exceeding the initial allyl halide content of the halobutyl polymer used in the production of butyl ionomer. The residual polyolefin may be present in an amount of from 0.1 mol % to an amount not exceeding the initial polyolefin content of the butyl polymer used in the production of halobutyl polymer. The residual polyolefin content of the ionomer is typically at least 0.4 mol %, preferably at least 1.0 mol %, and most preferably at least 3.0 mol %.

The butyl rubber ionomer may be used as a solution of butyl rubber ionomer dissolved in an organic solvent. In this case, the content of butyl rubber ionomer in the solution is preferably at least 0.1 wt %, more preferably at least 0.5 wt %, and even more preferably at least 1.0 wt %. When this content is too low, improved adhesion to the core surface or the like is unlikely and the durability to impact may worsen. The upper limit may be set to 20 wt % or less, preferably 10 wt % or less, and more preferably 5 wt % or less. When this content is too high, sufficient dissolution in the organic solvent may not occur.

Illustrative examples of the organic solvent include hexane, cyclohexane, isooctane, dichloromethane, chloroform, tetrachloroethane, trichloroethylene, benzene, toluene, ethylbenzene, dichlorobenzene and chlorotoluene. An organic solvent containing isooctane, benzene, toluene or chloroform is especially preferred.

The butyl rubber ionomer solution may include one or more filler. For example, use may be made of inorganic particles selected from the group consisting of silica, silicate, clay, bentonite, vermiculite, nontronite, beidellite, volkonskoite, hectorite, saponite, laponite, sauconite, layered polysilicate, kenyaite, ledikite, gypsum, alumina, titanium dioxide and talc, as well as mixtures thereof.

Examples of other preferred fillers include the following:
(1) highly dispersible silica produced by precipitation from a silicate solution or by flame hydrolysis of a silicon halide and having a specific surface area (BET specific surface area) of 50 to 1,000 m$^2$/g, preferably 20 to 400 m$^2$/g, and a primary particle size of 10 to 400 nm;
(2) aluminum silicate and alkaline earth metal silicates;
(3) magnesium silicate or calcium silicate having a BET specific surface area of 20 to 400 m$^2$/g and a primary particle size of 10 to 400 nm;
(4) kaolin and other naturally occurring silicas;
(5) montmorillonite and other naturally occurring clays;
(6) glass fibers and glass fiber products; and
(7) metal oxides, metal carbonates and metal hydroxides such as zinc oxide, calcium oxide, magnesium oxide, aluminum oxide, magnesium carbonate, calcium carbonate, zinc carbonate, aluminum hydroxide and magnesium hydroxide.

The content of filler included in the butyl rubber ionomer solution may be suitably adjusted within a range that does not detract from the advantageous effects of the invention. Specifically, it is preferable to include the inorganic filler in an amount of from 0.1 to 30 wt % based on the total weight of the layer.

Examples of treatment methods with a butyl rubber ionomer solution include methods in which the butyl rubber ionomer solution is applied to the core surface or the surface of any of various layers by brush coating or spraying, and methods in which the core or any of various layer-encased spheres is dipped in a butyl rubber ionomer solution as the treatment solution. From the standpoint of productivity and the efficiency of pick-up onto the core surface, the use of a dipping method is especially preferred.

The thickness of the butyl rubber ionomer-containing layer, although not particularly limited, is preferably in the range of 1 to 100 µm. Depending on the method of treatment with the butyl rubber ionomer solution, it is possible to form a butyl rubber ionomer-containing thin layer (skin layer) on the surface of the core or any of various layer-encased spheres. This thin layer has a thickness of preferably at least 1 µm, more preferably at least 2 µm, and even more preferably at least 3 µm, but not more than 100 µm, preferably not more than 50 µm, and even more preferably not more than 20 µm.

After the thin layer (skin layer) has been formed, a drying step to effect thorough drying may be suitably provided as a subsequent step.

In this invention, as mentioned above, by carrying out butyl rubber ionomer solution treatment on the surface of the core or any of various layer-encased spheres, adhesion between these layers is enhanced. Specifically, the bond strength, as measured by the subsequently described method, can be set to preferably at least 1.18 N/4 mm, and most preferably at least 1.37 N/4 mm.

EXAMPLES

The following Examples and Comparative Examples are provided to illustrate the invention, and are not intended to limit the scope thereof.

Examples 1 to 3, Comparative Examples 1 to 3

Core Formation

Cores for the respective examples of the invention and comparative examples were produced by preparing the rubber compositions shown in Table 1 below, then molding and vulcanizing the compositions under vulcanization conditions of 157° C. and 15 minutes.

TABLE 1

| | Core formulation | |
|---|---|---|
| (parts by weight) | A | B |
| Polybutadiene I | 80 | 80 |
| Polybutadiene II | 20 | 20 |
| Zinc acrylate | 34.5 | 41.0 |
| Zinc oxide | 4.0 | 4.0 |
| Barium sulfate | 19.4 | 16.8 |
| Antioxidant | 0.1 | 0.1 |
| Organic peroxide | 1.0 | 1.0 |
| Zinc salt of pentachlorothiophenol | 0.3 | 0.3 |
| Water | 0.4 | 1.0 |

Details on the rubber compositions shown in Table 1 are given below.
Polybutadiene I: Available as "BR 01" from JSR Corporation
Polybutadiene II: Available as "BR 51" from JSR Corporation
Zinc acrylate: Available from Nippon Joryu Kogyo Co., Ltd.
Zinc oxide: Available from Sakai Chemical Co., Ltd.
Barium sulfate: Available as "Precipitated Barium Sulfate 100" from Sakai Chemical Co., Ltd.
Antioxidant: Available as "Nocrac NS-6" from Ouchi Shinko Chemical Industry Co., Ltd.

Organic peroxide: Dicumyl peroxide, available as "Percumyl D" from NOF Corporation Next, in each of Examples 1 to 3 of the invention, a butyl rubber ionomer treatment solution formulated as shown in Table 3 was applied to the core surface by dipping the core in the solution at room temperature (27° C.) for the dipping time shown in Table 3, followed by thorough drying. In Comparative Example 3, instead of a butyl rubber ionomer solution, the treatment solution used was a butyl rubber solution.

Core Skin Layer
(1) Butyl Rubber Ionomer Solution

A butyl rubber ionomer was added to liquid chloroform and dissolved by 3 hours of stirring at room temperature.
Butyl rubber ionomer: supplied by Lanxess AG
Chloroform: guaranteed reagent, supplied by Kanto Chemical Co., Ltd.

(2) Butyl Rubber Solution

Butyl rubber was added to liquid chloroform and dissolved by 3 hours of stirring at room temperature.
Butyl rubber: "Butyl 365" supplied by JSR Corporation
Chloroform: guaranteed reagent, supplied by Kanto Chemical Co., Ltd.

Next, in each example, an envelope layer, an intermediate layer and an outermost layer were successively formed over the periphery of the core surface (and skin layer) by injection-molding the respective resin formulations shown in Table 2, thereby producing a multi-piece solid golf ball.

TABLE 2

| Formulation (pbw) | No. 1 | No. 2 | No. 3 |
|---|---|---|---|
| HPF 1000 | 100 | | |
| Himilan 1605 | | 50 | |
| Himilan 1706 | | 35 | |
| Himilan 1557 | | 15 | |
| Trimethylolpropane | | 1.1 | |
| T-8283 | | | 62.5 |
| T-8290 | | | 37.5 |
| Titanium oxide | | | 3.5 |
| Ultramarine | | | 0.4 |
| Polyethylene wax | | | 1 |

Details on the resin compositions shown in Table 2 are given below.
HPF 1000: An ionomer available from E.I. DuPont de Nemours & Co.
Himilan: An ionomer available from DuPont-Mitsui Polychemicals Co., Ltd.
T-8283, T-8290: MDI-PTMG type thermoplastic polyurethanes available under the trade name "Pandex" from DIC Bayer Polymer
Polyethylene wax: Available under the trade name "Sanwax 161P" from Sanyo Chemical Industries, Ltd.

The bond strengths and durability on impact of the resulting golf balls were evaluated as described below. The results are shown in Table 3.

Bond Strength

Figure 1:
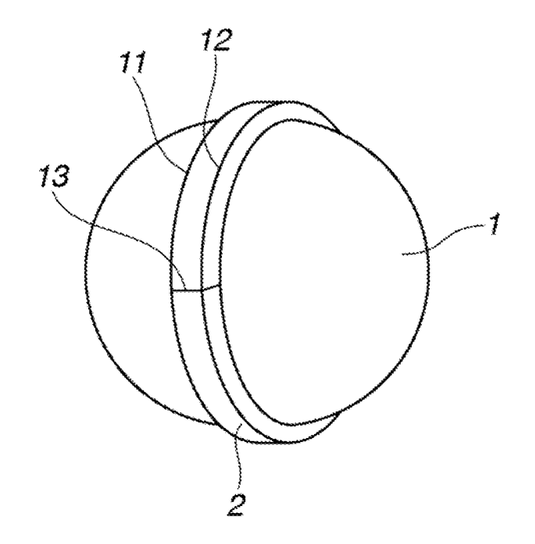
FIG. 1 is diagram depicting a method of obtaining a test specimen for measuring the bond strength between the core and the envelope layer of a golf ball.

Referring to FIG. 1, in a sphere composed of a core 1 encased by an envelope layer 2, two parallel cuts 11, 12 spaced 4.0 mm apart were made in the envelope layer 2 in such a way as to pass entirely through this layer, and the envelope layer 2 at both ends of the sphere was peeled off. Next, a lateral cut 13 passing entirely through the envelope layer 2 was made at a right angle to the first two cuts 11, 12, following which the bond strength was measured by immobilizing the core portion 1 and pulling on the cut end of the envelope layer 2. Measurement was carried out using an Instron tester and based on JIS K6256 ("Adhesion Test Method for Vulcanized Rubber and Thermoplastic Rubber"). Using the specially prepared test specimen described above, the clamp was moved at a speed of 50 mm/min and the tensile strength was measured at 0.1 mm intervals. The average of the tensile strengths for three test specimens, after discarding the first quarter and the last quarter of all the measurement points, was treated as the bond strength (units: N).

Durability on Impact

The durability of the golf ball was evaluated using an ADC Ball COR Durability Tester produced by Automated Design Corporation (U.S.). This tester fires a golf ball pneumatically and causes it to repeatedly strike two metal plates arranged in parallel. The incident velocity against the metal plates was set at 43 m/s and the number of shots required for the golf ball to crack was measured. Durability values for the balls in the respective examples were calculated relative to an arbitrary index of 100 for the average number of shots taken with the ball obtained in Example 3 (n=5). The durabilities of the balls were rated based on the following criteria, giving the results shown in Table 3.

Good: Durability value was 95 or more
NG: Durability value was less than 95

TABLE 3

| | | | Example | | | Comparative Example | | |
|---|---|---|---|---|---|---|---|---|
| | | | 1 | 2 | 3 | 1 | 2 | 3 |
| Construction | | | 4-piece | 4-piece | 4-piece | 4-piece | 4-piece | 4-piece |
| Core | | Rubber formulation | A | A | B | A | B | B |
| Core skin layer | | Chloroform | 98 | 98 | 98 | | | 98 |
| | | Butyl rubber ionomer | 2 | 2 | 2 | | | |
| | | Butyl rubber | | | | | | 2 |
| | | Dipping time (s) | 10 | 60 | 60 | | | 60 |
| | | Film thickness (μm) | 3.6 | 5.6 | 5.6 | | | 2.8 |
| Cover | Envelope layer | Resin formulation | | | No. 1 | | | |
| | Intermediate layer | Resin formulation | | | No. 2 | | | |
| | Outermost layer | Resin formulation | | | No. 3 | | | |

TABLE 3-continued

|  |  |  | Example | | | Comparative Example | | |
| --- | --- | --- | --- | --- | --- | --- | --- | --- |
|  |  |  | 1 | 2 | 3 | 1 | 2 | 3 |
| Ball properties | Peel value (N/4 mm) | | 1.86 | 2.05 | 1.45 | 1.01 | 0.96 | 0.48 |
|  | Durability at impact: | (Durability index) | 113 | 118 | 100 | 94 | 71 | 63 |
|  |  | Rating | good | good | good | NG | NG | NG |

* The numbers for the core skin layer indicate the content (%) within the treatment solution.

The test results shown in Table 3 are discussed below.

Comparative Example 1 is an example of a four-layer golf ball in which the core surface has not been treated. Compared with Examples 1 and 2 of the invention, the bond strength was low and the durability on repeated impact was low.

Comparative Example 2 is an example of a four-layer golf ball in which the core surface has not been treated. Compared with Example 3 of the invention, the bond strength was low and the durability on repeated impact was low.

Comparative Example 3 is an example of a four-layer golf ball in which the core surface was dip-treated with a butyl rubber solution. Compared with Example 3 of the invention, the bond strength was low and the durability on repeated impact was low.

By contrast, Examples 1 to 3, as shown in Table 3, had improved bond strengths between the core surface and the envelope layer. As a result, it is apparent that the durability of the ball on repeated impact was markedly improved.

Japanese Patent Application Nos. 2014-255854 and 2015-019282 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core of at least one layer and a cover of at least one layer, wherein a butyl rubber ionomer-containing layer is formed on a surface of the core, and wherein at least one layer of the core comprises components I to III below:
   (I) a base rubber,
   (II) an organic peroxide, and
   (III) water.

2. The golf ball of claim 1, further comprising from 0.1 to 30 wt % of an inorganic filler.

3. The golf ball of claim 1, wherein the butyl rubber ionomer is prepared from a halogenated butyl rubber reacted with a nitrogen- or phosphorus-containing nucleophilic agent.

4. The golf ball of claim 1, wherein the butyl rubber ionomer has an ionomer content of at least 0.1 mol %.

5. The golf ball of claim 1, wherein the butyl rubber ionomer-containing layer has a thickness of at least 1 μm and up to 100 μm.

6. The golf ball of claim 1, wherein one layer adjoining the butyl rubber ionomer-containing layer is formed primarily of a material obtained by blending as essential components:
   100 parts by weight of a resin component composed of, in admixture,
   (A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random copolymer and/or a metal ion neutralization product of an olefin-unsaturated carboxylic acid-unsaturated carboxylic acid ester random copolymer in a weight ratio between 100:0 and 0:100, and
   (B) a non-ionomeric thermoplastic elastomer in a weight ratio between 100:0 and 50:50;
   (C) from 5 to 120 parts by weight of a fatty acid and/or fatty acid derivative having a molecular weight of from 228 to 1,500; and
   (D) from 0.1 to 17 parts by weight of a basic inorganic metal compound capable of neutralizing un-neutralized acid groups in the base resin and component C.

7. The golf ball of claim 1, wherein the butyl rubber ionomer-containing layer has a bond strength with a layer adjoining thereto of at least 1.18 N/4 mm.

8. A method of manufacturing a golf ball having a core of at least one layer and a cover of at least one layer, comprising the steps of, in order:
   preparing a treatment solution of butyl rubber ionomer dissolved in a solvent;
   applying the treatment solution to a surface of the core; and
   covering the treated layer with, as an outer layer adjoining thereto, with a rubber layer, a resin layer or a paint layer,
   wherein at least one layer of the core is formed of a material molded under heat from a rubber composition comprising components I to III below:
   (I) a base rubber,
   (II) an organic peroxide, and
   (III) water.

9. The method of claim 8, wherein the butyl rubber ionomer is prepared from a halogenated butyl rubber reacted with a nitrogen- or phosphorus-containing nucleophilic agent.

10. The method of claim 8, wherein the butyl rubber ionomer treatment solution is applied to at least one layer from among the core and the cover of the ball by a dipping method.

11. The method of claim 10, wherein the dipping method is carried out at room temperature.

12. The method of claim 8, wherein the solvent used to prepare the butyl rubber ionomer treatment solution includes isooctane, benzene, toluene or chloroform.

13. The golf ball of claim 1, wherein the base rubber serving as component I is a polybutadiene synthesized with a rare-earth catalyst or a group VIII metal compound catalyst.

14. The golf ball of claim 1, wherein the water serving as component III is distilled water or tap water.

15. The golf ball of claim 1, wherein the amount of water serving as component III included per 100 parts by weight of the base rubber is from 0.1 to 5 parts by weight.

16. The method of claim 8, wherein the base rubber serving as component I is a polybutadiene synthesized with a rare-earth catalyst or a group VIII metal compound catalyst.

17. The method of claim 8, wherein the water serving as component III is distilled water or tap water.

18. The method of claim 8, wherein the amount of water serving as component III included per 100 parts by weight of the base rubber is from 0.1 to 5 parts by weight.

* * * * *